United States Patent
Frech et al.

(10) Patent No.: US 6,418,907 B1
(45) Date of Patent: Jul. 16, 2002

(54) METHOD AND DEVICE FOR THE OPERATION OF A DRIVE UNIT ON A VEHICLE

(75) Inventors: Eberhard Frech, Kirchheim; Martin Froehlich, Linkenheim-Hochstetten; Lothar Gamer, Bruchsal; Joerg Kerner, Mundelsheim, all of (DE); Alois Moser, Ann Arbor, MI (US); Lutz Reuschenbach; Werner Hess, both of Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/445,057

(22) PCT Filed: Apr. 6, 1999

(86) PCT No.: PCT/DE99/01031

§ 371 (c)(1),
(2), (4) Date: Jan. 20, 2000

(87) PCT Pub. No.: WO01/79626

PCT Pub. Date: Oct. 25, 2001

(30) Foreign Application Priority Data

Apr. 2, 1998 (DE) .......................................... 198 14 743

(51) Int. Cl.⁷ ................................ F02D 9/10; F02P 5/15
(52) U.S. Cl. .................... 123/325; 123/350; 123/406.5; 123/406.51; 123/399; 123/492; 123/493
(58) Field of Search ................................. 123/325, 350, 123/406.23, 406.25, 406.46, 406.5, 406.51, 492, 493, 399

(56) References Cited

U.S. PATENT DOCUMENTS

| 5,265,570 A | | 11/1993 | Schnaibel et al. | |
| 5,558,178 A | | 9/1996 | Hess et al. | |
| 5,595,159 A | | 1/1997 | Huber et al. | |
| 5,676,112 A | * | 10/1997 | Bauer et al. | 123/350 |
| 5,692,472 A | * | 12/1997 | Bederna et al. | 123/350 |
| 5,983,861 A | * | 11/1999 | Nishio et al. | 123/399 |
| 6,006,724 A | * | 12/1999 | Takahashi et al. | 123/399 |
| 6,058,349 A | * | 5/2000 | Kikori et al. | 123/399 |
| 6,157,888 A | * | 12/2000 | Suzio et al. | 123/399 |
| 6,223,721 B1 | * | 5/2001 | Bauer et al. | 123/406.51 |
| 6,343,586 B1 | * | 2/2002 | Muto et al. | 123/399 |

FOREIGN PATENT DOCUMENTS

| EP | 0631897 | 1/1995 |
| FR | 2739660 | 4/1997 |
| WO | WO88/06234 | 8/1988 |
| WO | WO 94/24429 | 10/1994 |

* cited by examiner

Primary Examiner—Erick Solis
(74) Attorney, Agent, or Firm—Walter Ottesen

(57) ABSTRACT

A method and an arrangement for operating a drive unit of a vehicle are suggested. A desired value is preset and an actual value corresponding to the desired value is determined. The desired value is filtered in at least one operating situation. At the start of filtering, the filter is initialized with the determined actual value.

10 Claims, 3 Drawing Sheets

METHOD AND DEVICE FOR THE OPERATION OF A DRIVE UNIT ON A VEHICLE

FIELD OF THE INVENTION

The invention relates to a method and an arrangement for operating a drive unit of a vehicle.

BACKGROUND OF THE INVENTION

A torque-orientated engine control is known from U.S. patent application Ser. No. 09/051,340, filed Apr. 6, 1998, wherein a driver command torque is formed on the basis of the position of an operator element, which is actuated by the driver, and, if needed, at least one further operating variable. The desired torque for the adjustment of the torque of the drive unit is derived from this driver command torque. From this command torque, a desired torque for adjusting the torque of the drive unit is derived which, in the case of an internal combustion engine, leads to a corresponding influencing of the air supply, the ignition angle and/or the fuel metering. To improve comfort, the desired torque is filtered with a pregiven filter function.

In this context, situations can occur in the dynamic operating state wherein the adjusted torque and the driver command torque differ from one another. However, if in such a situation filtering takes place and the filtered desired torque is adjusted as rapidly as possible, then a jump in the course of the torque occurs when this rapid torque adjustment is enabled and this can affect the comfort of the control. The above situation can, for example, take place in the case of an internal combustion engine by controlling the ignition angle, the air/fuel ratio and/or by suppression of individual injections.

SUMMARY OF THE INVENTION

It is the object of the invention to provide measures by which the comfort of the torque control is improved.

The basic structure of a torque-orientated control system for an internal combustion engine is known from DE-A 42 39 711 (U.S. Pat. No. 5,558,178).

It is known from EP-A 631 897 to detect a change of load situation and to thereupon undertake a limiting of the rate of change of the speed of the accelerator pedal positioning signal. Here too, the above-mentioned problems occur.

By initializing a desired value filter at the start of filtering with the actual value, a jump-shaped course of the actual value is effectively prevented which occurs when the actual value and the desired value differ at the start of filtering.

The application is especially advantageous in connection with a torque-orientated engine control wherein a driver command torque is formed on the basis of the actuating signal of an operator-controlled element. The actuating signal is filtered at least in one operating state and is adjusted in dependence upon the filtered value by controlling at least one power parameter of the drive unit.

Special advantages result when a rapid adjustment of the desired value takes place by, for example, control of the ignition angle and/or of the fuel metering. In this case, no torque jump occurs at the start of filtering.

BRIEF DESCRIPTION OF THE DRAWINGS

The invention is explained in greater detail below with respect to the embodiments shown in the drawing.

DESCRIPTION OF THE PREFERRED EMBODIMENTS OF THE INVENTION

Figure 1:
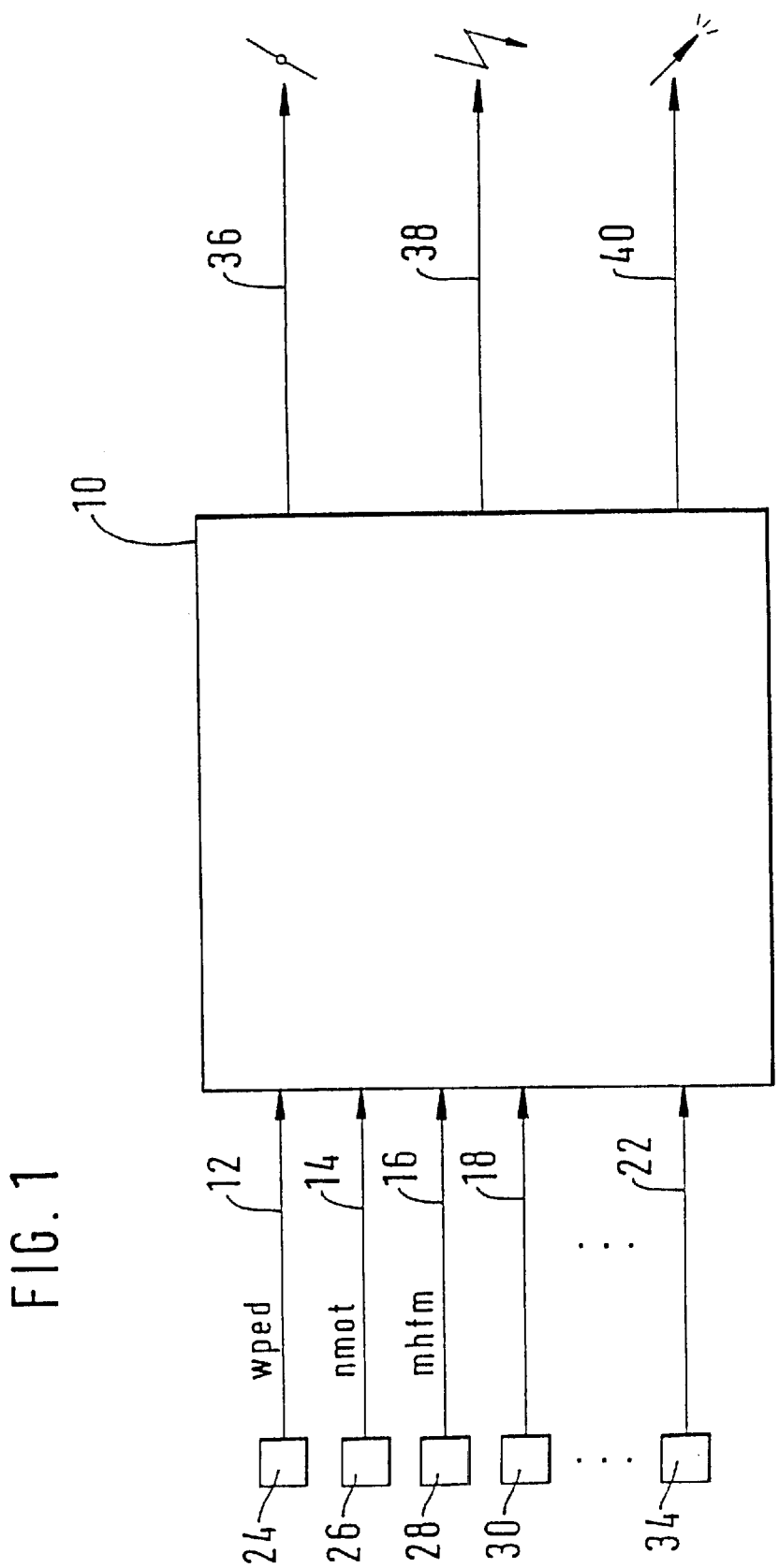
FIG. 1 is an overview block diagram of an engine control system having a control apparatus containing at least one microcomputer.

FIG. 1 shows a control unit 10 which includes at least one microcomputer (not shown). The control unit 10 is connected to input lines (12, 14, 16) as well as 18 to 22. Operating variables for carrying out the control of a drive unit (not shown) are supplied via the input lines. The drive unit is preferably an internal combustion engine. The input line 12 supplies from a corresponding measuring device 24 the degree of actuation wped, for example, the position of an operator-controlled element actuated by the driver which is preferably an accelerator pedal. The input line 14 supplies from a corresponding measuring device 26 a signal representing the engine rpm nmot and the input line 16 supplies from a corresponding measuring device 28 a signal representing the load (for example, the inducted air mass mhfm). In addition, input lines 18 to 22 are provided via which corresponding measuring devices 30 to 34 supply further variables in the form of operating variables which are evaluated for controlling the drive unit. For example, for internal combustion engines, the engine temperature, the inducted air temperature, and the intake pressure, et cetera are evaluated.

The control unit is connected via output lines (36, 38, 40) to actuator devices (not shown) for adjusting various power parameters of the internal combustion engine. For example, the control unit 10 drives an electrically actuable throttle flap via line 36 to control the air supply to the engine. Correspondingly, the ignition angle and the fuel metering are controlled via the symbolically represented lines 38 and 40 (inter alia, influencing the air/fuel ratio and/or suppression of individual injections).

In a torque-orientated control structure, a driver command torque is derived from the degree of actuation of the operator-controlled element and, if required, from additional variables. This driver command torque is filtered in specific operating situations, for example: for a change of load (transition from overrun operation to traction operation of the internal combustion engine), when pulling back the operator-controlled element (dashpot) and/or with the occurrence of fuel cutoff in the overrun mode of operation or when fuel metering is resumed. From the driver command (filtered or not filtered), a desired torque is derived (if necessary by also considering additional desired torques such as from a drive slip control, et cetera) which is adjusted by control of the air supply and while considering an actual torque by adjusting the ignition angle and/or influencing the fuel metering. In one embodiment, at least the ignition angle is influenced by a surge damping control and/or an idle control which influence the actual torque independently of the driver command torque.

Especially in dynamic operating states, it can occur that the actual torque does not correspond precisely to the driver command torque. If the driver command torque is filtered in such a situation and this filtered torque is adjusted as rapidly as possible (for example, via the ignition angle and/or the fuel metering), a jump in the actual torque occurs which can be uncomfortably noticed by the driver. This is so because the driver command torque and the actual torque do not correspond to each other and the ignition angle is adjusted on the basis of these two variables in the sense of reducing the deviation.

Such an unwanted performance can be effectively avoided when the filter is initialized with the actual torque at the start of filtering. This means that first the present actual torque is outputted as a driver command torque so that, in the first instant, no deviation is present between the desired torque and the actual torque so that no intervention and no torque jump occurs. In the further course, the torque change adapts to the course of the filtered driver torque command.

As actual torque, in the preferred embodiment, the actual corrected torque is used which is corrected with interventions of a surge damping function and/or an idle control. It has, however, been shown that no worse performance results when these corrections were not made so that in several embodiments it is also not necessary to make this correction with respect to the actual torque.

In carrying out this procedure, a jump-shaped trace of the desired torque or of the driver command torque arises at the start of filtering.

Figure 2:
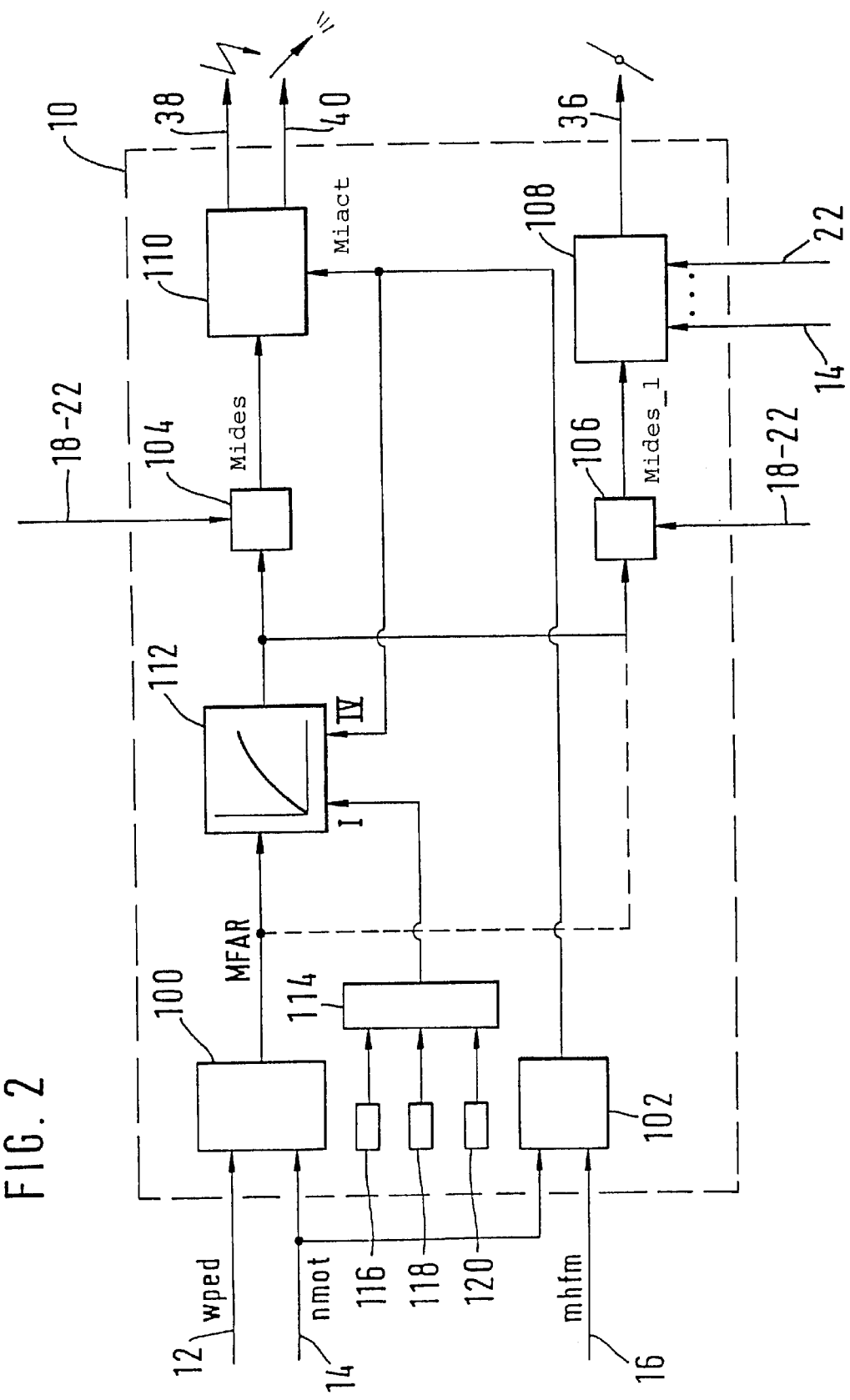
FIG. 2 is a sequence diagram which outlines a program for this microcomputer for carrying out the filtering according to the invention; and, FIG. 3 shows a time diagram for explaining the operation of the procedure.

In FIG. 2, a sequence diagram is shown, which outlines a program of the microcomputer of the control unit 10 for carrying out the described procedure. The individual elements then define programs which execute the described functions.

In 100, the driver command torque MFAR is formed, for example, in accordance with a characteristic field and/or a table and/or computation steps dependent upon the degree of actuation wped and the engine rpm nmot. This driver command torque MFAR defines a desired torque of the internal combustion engine which corresponds to the degree of actuation and therefore to the driver command. A concrete procedure for determining the driver command torque is known from the state of the art initially referred to herein. Especially, the minimum torque, which is pregiven by an idle control, can be considered.

Further, in 102, a signal, which represents an actual torque Miact of the engine, is formed in dependence upon the engine rpm nmot and the engine load (here the inducted air mass mhfm), likewise in accordance with a characteristic field, a table or pregiven computation steps. Other operating variables are considered such as known from the state of the art initially mentioned herein, especially the actual ignition angle adjustment as well as, if necessary, the actual adjustment of the fuel metering.

In addition to the driver command torque, as a rule, additional desired torques are present such as a reducing torque of a drive slip control, a desired torque of a transmission control during shifting operation, a limiting torque for limiting the rpm, the speed, et cetera (see lines 18 to 22). The particular suitable torque is selected by minimal value output stage 104 and/or maximum value output stage 106. Here, in a preferred embodiment, a desired torque Mides_1 is determined for the adjustment of the air supply (slow intervention) and at least one desired torque Mides is determined for the adjustment of the ignition angle and/or of fuel metering (rapid intervention).

The desired value Mides_1 for the air supply is converted in 108 into a drive signal for the actuator device while considering operating variables such as engine rpm, engine load, air pressure, intake air, temperature, position of the actuator device. The drive signal is outputted via the output line 38 to the actuator device. An example for a realization is known from the state of the art mentioned initially herein.

The adjustment of the ignition angle and/or of the fuel metering for realizing the desired torque Mides takes place in accordance with 110 while considering the computed actual torque Miact especially in dependence upon the deviation between the desired torque and the actual torque. For this procedure also, the state of the art mentioned initially herein offers an example wherein additional variables for determining the ignition angle and/or the fuel metering are evaluated which are not shown in FIG. 2. The corresponding control signals are outputted via 36 or 40.

In the preferred embodiment, a so-called surge damping function is provided which, in dependence upon the extent of the rpm oscillations, forms a control signal in the sense of reducing the oscillations. The control signal is at least, for example, additively superposed upon the desired torque Mides for adjusting the ignition angle. The corresponding variation of the actual torque by this function is considered in one embodiment in the computation of the actual torque Miact in 102. The same applies for an idle control by which at least the desired torque Mides is corrected in the sense of an approximation of the actual rpm to a desired rpm.

Outside of the operating situations described below, the driver command torque is adjusted with the dynamic, which is pregiven by the driver, via control of the ignition angle and/or the fuel metering as well as the air supply. Here, at least in the dynamic operating state, it can happen that driver command torque and actual torque are not the same.

To improve the drivability of the vehicle, at least one filter 112, for example a lowpass filter, is provided, which is activated only in specific operating situations during which operating situations, with a rapid change of the driver command torque and with a correspondingly fast change of the actual torque, an operating performance of the vehicle occurs which is unfavorable for driving comfort. This unfavorable driving comfort can, for example, be a noticeable vibration of the drive train. With the filter, such vibrations can be made more mild or can be suppressed. Such operating situations are, for example, a load change (transition from overrun operation of the engine into traction operation), a very rapid pull-back of the accelerator pedal and/or the cutoff or resumption of the fuel metering in overrun operation. The filter is activated when an operating situation of this kind is recognized. Outside of these operating situations, the filter is inactive. For the sake of completeness, it should be mentioned that, depending upon the equipment, for each of these situations, a dedicated filter is provided or a dedicated filter constant is provided for each of these situations. Depending upon the configuration, filtering is done in only one or in a desired combination of the above-mentioned operating situations.

When one of the above-mentioned operating situations is recognized, the filter is activated (initialized) via the symbolic input I. If, at this instant, actual torque and driver command torque are different, then the actual torque is changed in a jump-like manner by the rapid adjustment of the desired torque via the rapid intervention 110 so that a performance occurs which is opposed to the intended action of the filter.

For this reason, the filter itself is initialized (see symbolic input IV) with the actual value of the computed actual torque when activating the filter. Here, the corrections of a surge damping function and/or of the idle control are preferably computed in the actual torque. In other embodiments, this can be omitted without the occurrence of a significant deterioration of the performance.

The occurrence of an operating situation wherein filtering is undertaken is determined in 116, 118 and 120. When there is an occurrence of at least one operating situation, a corresponding activation signal is transmitted to the filter 112 via an OR-connection 114. In 116, a load change is recognized when, for example, the zero torque characteristic line is exceeded (throttle flap position exceeds an rpm-dependent limit value, that is, a transition from overrun operation to traction operation was detected. In 118, a rapid pull-back of the accelerator pedal is detected by comparison of the negative change of the degree of actuation wped or the driver command torque MFAR with a pregiven limit value. This leads to the filtering of the driver command torque (so-called dashpot). In 120, and for a released accelerator pedal, as known, the cutoff and resumption of the metering of fuel is recognized by means of a comparison of the engine rpm with a threshold value.

The actual realization of the procedure takes place via programs which reflect the described functions.

Figure 3:
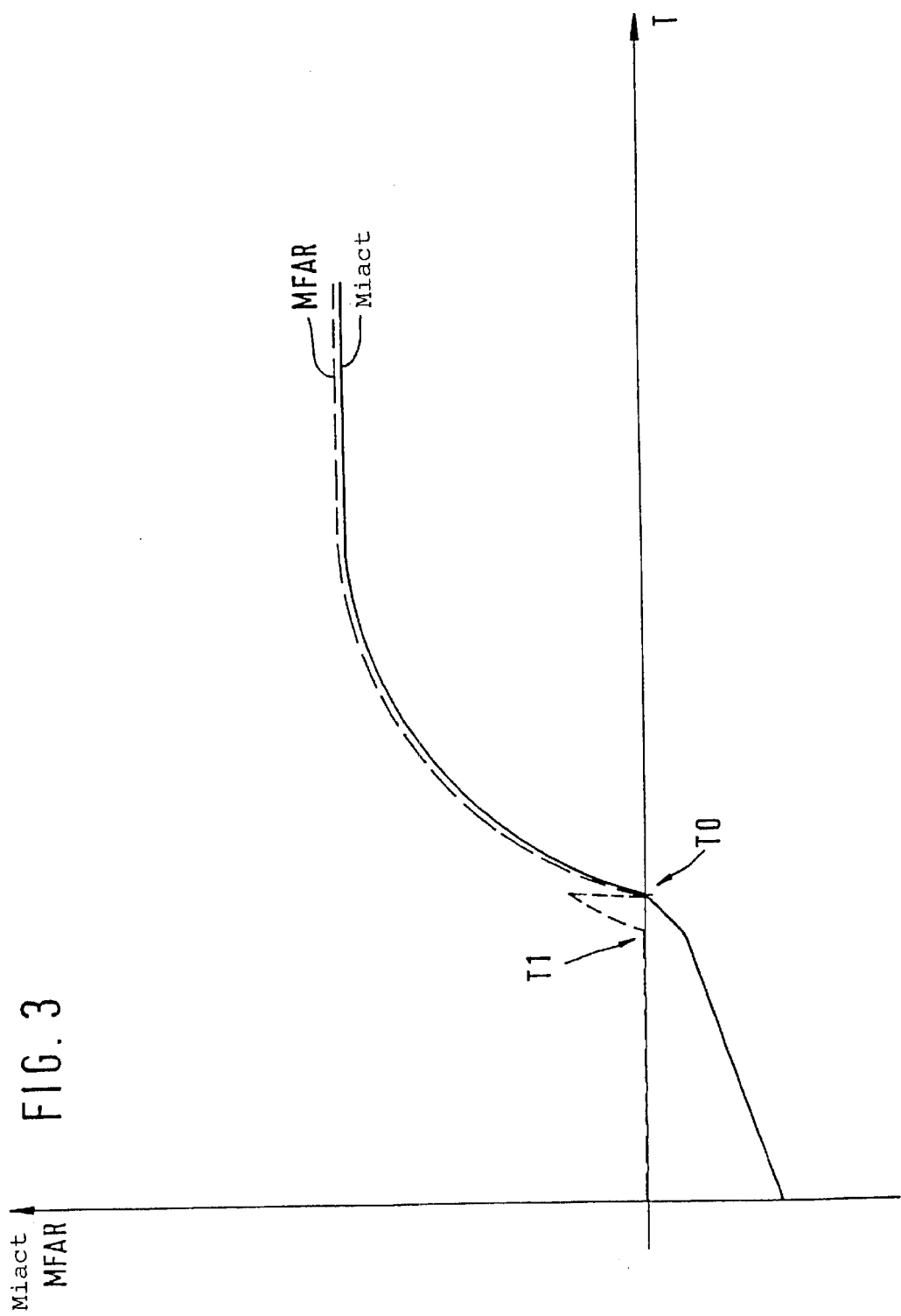

FIG. 3 shows a time diagram which makes clear the operation of the procedure. Here, the actual torque Miact (solid line) and the driver command torque MFAR (broken line) are plotted. The operation situation shown is a load change.

First, the driver command torque is at a minimum value, the accelerator pedal is released. The actual torque is negative because the engine is driven by the vehicle. At time point Ti, the driver actuates the pedal and the driver command torque increases. At time point T0 (the illustration is not true to scale), the load change is recognized. This leads to the condition that the filter is initialized with the actual value of the actual torque (here zero). Thereafter, a filtered trace of the driver command torque and the actual torque follows. At time point To, a jump-shaped course of the driver command torque results because of the described procedure; whereas, the trace of the actual torque is without a jump.

The described procedure is used only in combination with the filtering of the driver command desired torque. A corresponding procedure is utilized in combination with an accelerator pedal actuating signal (desired value for the throttle flap position), a power desired value, a desired load value, a desired rpm value, et cetera. The initialization is made with the corresponding actual value (throttle flap position, actual power, et cetera).

What is claimed is:

1. A method of operating a drive unit of a vehicle, the method comprising the steps of:

presetting a desired value and determining an actual value corresponding to said desired value;

filtering said desired value in at least one operating situation of said drive unit; and, initializing said filtering of said desired value at the start of said filtering utilizing the determined actual value.

2. The method of claim 1, wherein said drive unit is an internal combustion engine; and, said at least one operating situation is at least one of the following: a load change in the form of a transition from overrun operation of said drive unit to traction operation, a rapid pull-back of the accelerator pedal; and, the cutoff or resumption of the metering of fuel in overrun operation.

3. The method of claim 1, wherein said desired value is a driver command desired torque which is adjusted at least by control of at least one of: the ignition angle and the metering of fuel.

4. The method of claim 3, wherein said actual value is an actual torque.

5. The method of claim 3, wherein said filtering is undertaken with at least one filter.

6. The method of claim 5, wherein said one filter is a lowpass filter.

7. The method of claim 1, wherein a jump in the desired value occurs with the initialization of said filtering when said desired value does not correspond precisely to said actual value.

8. The method of claim 1, comprising the further step of considering corrections for said actual value via functions which include a surge damping function and/or an idle closed-loop control.

9. The method of claim 1, wherein no filtering of said desired value takes place outside of said at least one operating situation.

10. An arrangement for operating a drive unit of a vehicle, the arrangement comprising:

a control unit which presets a desired value for controlling the drive unit and determines the actual value corresponding to said desired value;

said control unit including a filter for filtering said desired value in at least one operating situation; and, said control unit including means for initializing said filter with the determined actual value when said at least one operating situation is present.

* * * * *

UNITED STATES PATENT AND TRADEMARK OFFICE
CERTIFICATE OF CORRECTION

PATENT NO.     : 6,418,907 B1
DATED          : July 16, 2002
INVENTOR(S)    : Eberhard Frech et al.

It is certified that error appears in the above-identified patent and that said Letters Patent is hereby corrected as shown below:

Column 6,
Line 18, delete "claim 3" and substitute -- claim 1 -- therefor.

Signed and Sealed this

First Day of July, 2003

JAMES E. ROGAN
*Director of the United States Patent and Trademark Office*